ARTHUR S. LOONE
INVENTOR

ATTORNEY

Feb. 3, 1942.  A. S. LOONE  2,272,125
APPLIANCE FOR MIXING MATERIALS
Filed Sept. 29, 1939  2 Sheets-Sheet 2

ARTHUR S. LOONE
INVENTOR

ATTORNEY

Patented Feb. 3, 1942

2,272,125

UNITED STATES PATENT OFFICE 2,272,125

APPLIANCE FOR MIXING MATERIALS

Arthur Stanley Loone, Concord, New South Wales, Australia

Application September 29, 1939, Serial No. 297,027 In Australia January 14, 1939

2 Claims. (Cl. 74—16)

The present invention relates to mechanically hand driven mixing appliances that are used for the preparation of certain food stuffs, such as cakes, puddings, custards, etc. The invention may also be used by druggists for mixing ointments, pastes, and other preparations.

It has been found that with certain makes of mixing appliances when in use the ingredients adhere to the wall of the mixing bowl which necessitates stoppage of the process and consequent loss of time in order to free the mixture from the bowl.

In this invention means are provided whereby the mixture is mechanically wiped from the wall of the bowl during the process of mixing and returned to the central beaters or mixers.

The appliance is simple to construct having but few working parts, and simple means have been devised for the easy removal and replacing of the parts that require to be cleaned after use.

The driving gear works in an oil bath enclosed within a box and means are provided to prevent the escape of the oil.

Whilst the appliance in its simplest form is arranged to be driven by hand it may also be driven by a suitable motor without departing from the spirit of the invention.

The invention will now be fully described and reference made to the accompanying drawings in which.

Figure 1:
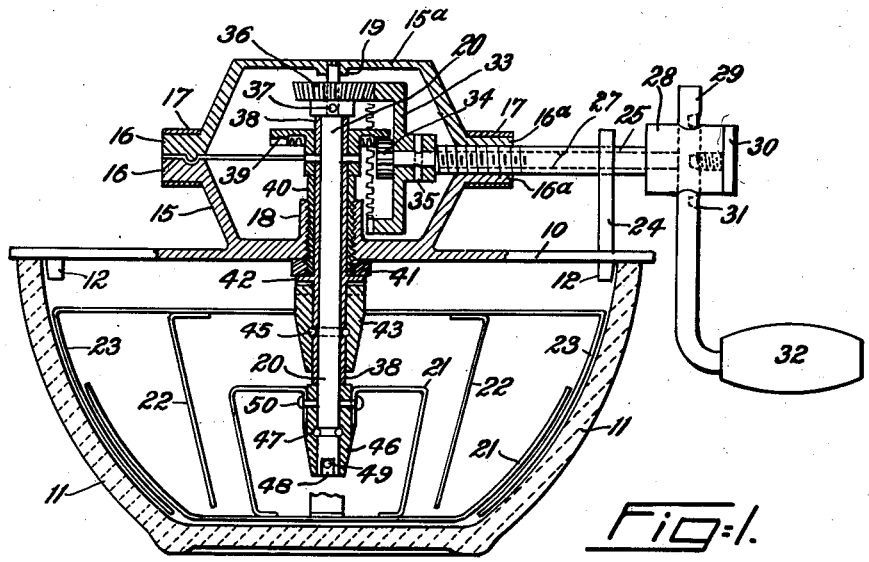
Figure 1 is a central sectional elevation showing one form in which a mixing appliance and bowl may be constructed according to this invention.
Figure 2:
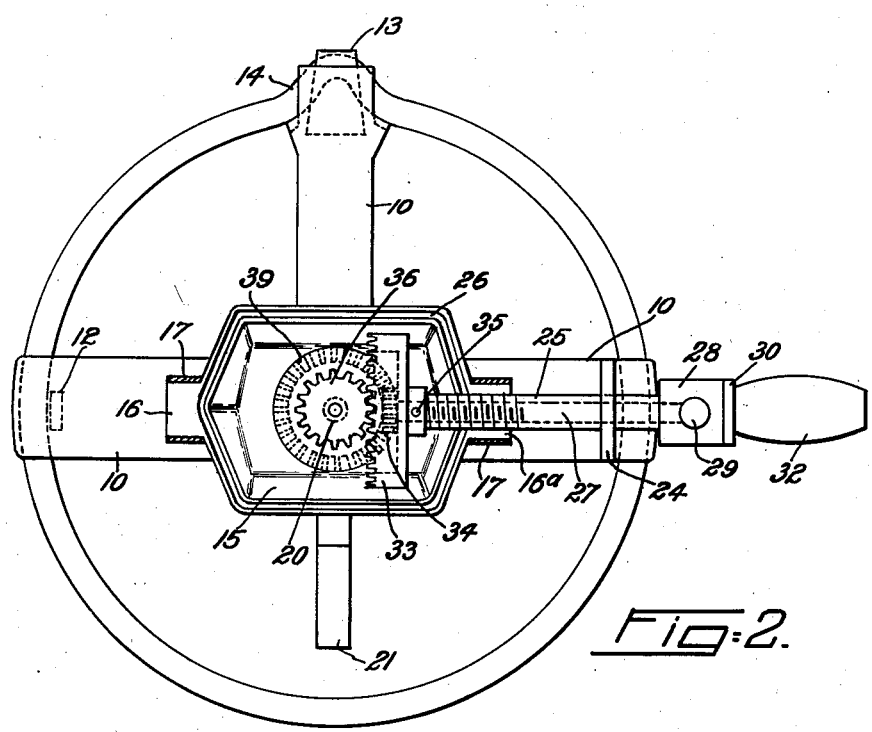
Figure 2 is a plan view partly in section of Figure 1 but with the cover of the driving gear box removed.
Figure 3:
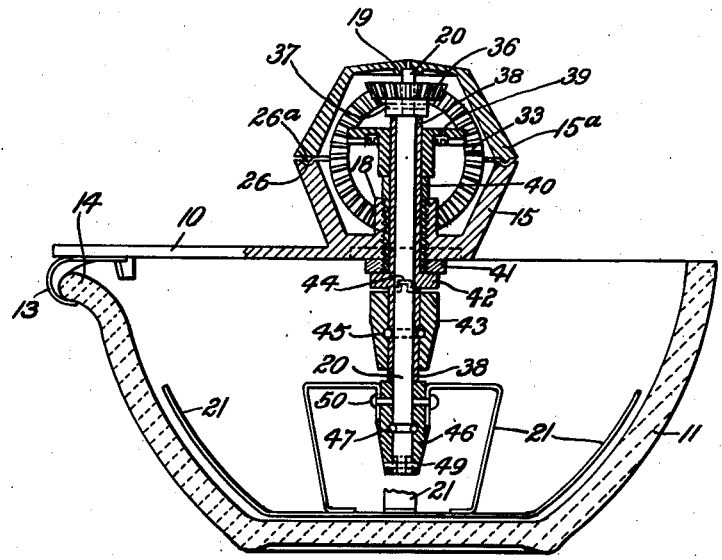
Figure 3 is a central vertical section of Figure 1, but with the scraper arms removed.
Figure 4:
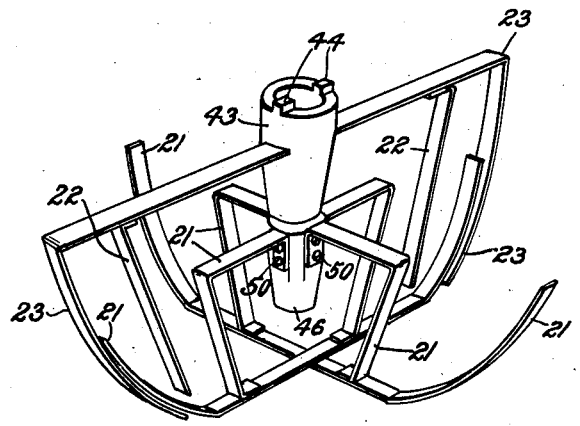
Figure 4 is a perspective view of the beaters and scrapers disconnected from the driving gear and removed from the bowl.

According to the construction shown in the accompanying drawings the mixing appliance is mounted upon a platform or frame 10 which is seated upon a suitable bowl of glass or other material. The platform or frame is provided with a number of stops 12 on its underside such stops being positioned so that they impinge against the inner face of the rim of the bowl and a spring clip 13 adapted to engage with the lip 14 of the bowl 11 is also provided in order to assist to maintain the frame 10 in position upon the bowl. The frame 10 may be of cast or stamped metal and is shaped so that the lower half 15 of the driving gear box may be rigidly secured thereto, the other half 15a being seated upon it. Each half of the gear box 15a—15 is provided with two oppositely positioned semi-cylindrical extensions 16 and 16a the pair of extensions 16a being axially bored and internally screw threaded. When the two halves of the gear box are in position a short slidable ferrule 17 is slid over each pair and the two halves 15a—15 are thus fastened together. The engaging faces of the two halves of the gear box are respectively grooved and beaded at 26 and 26a so that when a suitable oil jointing material is placed between them an oil tight joint will be made when they are fastened together by the ferrules 17. Integral with and within the lower half 15 of the box is a centrally positioned tubular boss 18 that is internally screw threaded. This formation enables a quantity of oil to be held in the lower half so that the gear therein may be constantly lubricated. Integral with and within the upper half 15a of the gear box is a recessed boss 19 that is in axial alignment with the tubular boss 18, the recess being for the purpose of forming a bearing for the upper end of a vertical shaft 20.

In order to ensure the more complete mixing of materials two sets of beaters 21 and 22 are employed and the driving gear is arranged to drive the beaters 21 at a faster speed than the beaters 22 and scrapers 23. One method of obtaining the different speeds is shown on the drawings and is as follows:

The frame 10 is provided with a standard 24 near the upper end of which is a hole through which a sleeve 25 passes, the inner end of such sleeve being externally screw threaded to engage with the internal screw threads on the two semi-cylindrical extensions 16a. The sleeve 25 forms a bearing for a horizontal driving shaft 27 to the outer end of which is secured a boss 28 that is provided with a transverse hole through which a crank 29 is passed and secured by means of a set screw 30 that engages with any one of a plurality of notches 31 in the radial arm of the crank 29 in order to provide a variable stroke for the crank. The crank 29 will be provided with a suitable handle 32 whereby it may be manually driven but other means may be employed in order to enable the shaft 27 to be power driven. The inner end of the shaft 27 projects into the box 15a—15 and to it are rigidly secured a crown wheel 33 and pinion 34 by means of a cross pin 35.

The horizontal shaft 27 transmits motion to the vertical shaft 20 through the crown wheel 33 that meshes with a bevelled gear wheel 36 that is rigidly secured to at or near the upper end of the vertical shaft 20 by a cross pin 37 or other suitable means. Slower motion is transmitted from the horizontal shaft 27 to the sleeve shaft 38 through the pinion 34 and a crown wheel 39 that is rigidly secured near the upper end of the sleeve shaft 38. The sleeve shaft 38 is rotatably secured in a fixed sleeve bearing 40 that is provided with an external screw thread to enable it to be screwed into the screw threaded boss 18 and secured in position by a lock nut 41. The sleeve shaft 38 is provided with a flange 42 at or about its centre, such flange abutting against the underneath face of the lock nut 41. Upon the sleeve shaft 38 is a tubular boss 43 that is provided with the tooth members 44 of a dog clutch the co-acting members of which are formed in the underside of the flange 42 on the sleeve shaft 38 in order that the boss 43 may be slid on and off the sleeve shaft 38 when required and also be rotated thereby when the appliance is in use. In order to retain the boss 43 in the rotatable position upon the sleeve shaft 38, a spring grip ring 45 is partly housed in an annular groove formed within the boss 43 and in a corresponding position externally upon the sleeve shaft 38.

The lower end of the shaft 20 projects below the sleeve shaft 38 and upon the projecting end another boss 46 is positioned and retained by means of a spring grip 47 similar to the ring grip 45 previously described. In order to cause the boss 46 to rotate with the shaft 20 the lower end of the latter is provided with a transverse slot to accommodate a cross pin 49 that is passed through the boss 46.

The scrapers 23 are rigidly secured to the boss 43 by brazing or in any other suitable manner and consist of radial arms having extensions that are bent to conform to the shape of the inner face of the mixing bowl 11 so that when they are rotated with the boss they will do so between the outer members of the beaters 21 and the inner face of the bowl. They will lie in close proximity to the inner face of the bowl in order that as they rotate they will scrape off the material adhering thereto. As previously explained the scrapers rotate at a slower speed than the beaters 21 that are secured to and rotated by the boss 46, but the beaters 22 are secured by rivets or other means to the radial members of the scrapers 23 and therefore rotate at a slower speed than the beaters 21. The beaters 21 are secured to the boss 46 by screws 50 or other suitable means but it will be understood that whilst the shape and arrangement of the beaters may be as illustrated in the drawings other shapes and arrangements may be used within the ambit of this invention.

It will be understood that whilst the frame 10 has been mentioned in this specification and illustrated in the drawings it may be necessary to substitute a disc for the frame 10 in order to prevent any of the material being mixed from being thrown out of the bowl.

I claim:

1. In an appliance for mixing materials, removable actuating means comprising a frame adapted to be removably seated on the top of a container, a sectional casing mounted on said frame, a tubular boss positioned centrally in the lower section of and extending into said casing, a sleeve bearing threaded through and secured in said boss, a rotatable sleeve shaft journalled in said sleeve bearing and extending below said frame, a rotatable drive shaft journalled in and extending below said sleeve shaft, means housed within the casing for rotating said sleeve shaft and said drive shaft simultaneously, a hub journalled on the lower end of and having a driving connection with said sleeve shaft, an annular groove on said sleeve shaft registering with an annular groove in the inner wall of said hub, a spring grip ring housed in said grooves to maintain said hub in position on said sleeve shaft and permitting said hub to be forcibly slid off said sleeve shaft, a hub journalled on the lower end of and having a driving connection with said drive shaft, an annular groove on said drive shaft registering with an annular groove in the inner wall of said second hub, a spring grip ring housed in said grooves to maintain said second hub in position on said drive shaft and permitting said second hub to be forcibly slid off said drive shaft.

2. In an appliance for mixing materials, having stirring elements, removable means for actuating the stirring elements comprising a frame adapted to be seated on the top of a container, a gear casing formed in two sections mounted on said frame, each section being provided with semi-cylindrical extensions registering with each other, ferrules adapted to slide over the respective pairs of said extensions to hold said sections together and to be similarly removed when said sections are to be separated, a tubular boss positioned centrally in the lower section of said casing, a sleeve bearing threaded through and secured in said boss with a liquid tight fit, a rotatable sleeve shaft journalled in said sleeve bearing and extending below said frame, a rotatable drive shaft journalled in said sleeve shaft and extending below said sleeve shaft, means housed within the casing for rotating said sleeve shaft and said drive shaft, a hub removably mounted on the lower end of said sleeve shaft, and a hub removably mounted on the lower end of said drive shaft.

ARTHUR STANLEY LOONE.